No. 780,960. PATENTED JAN. 24, 1905.
F. C. PALMER.
WALL HOOK.
APPLICATION FILED AUG. 25, 1904.
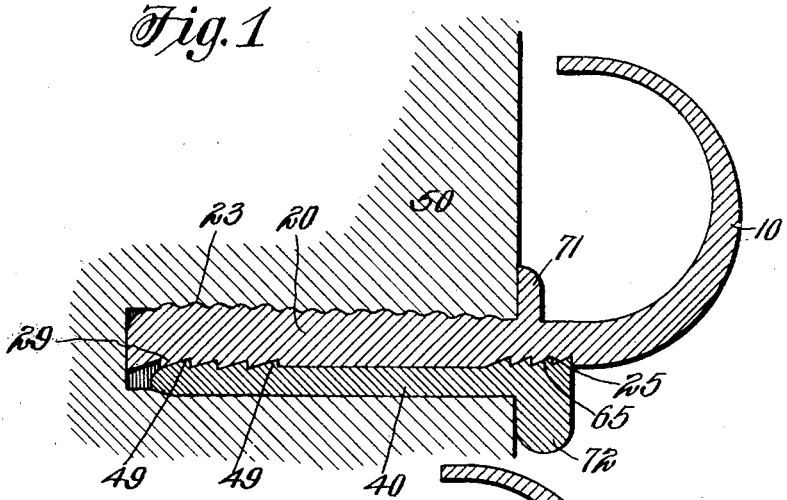
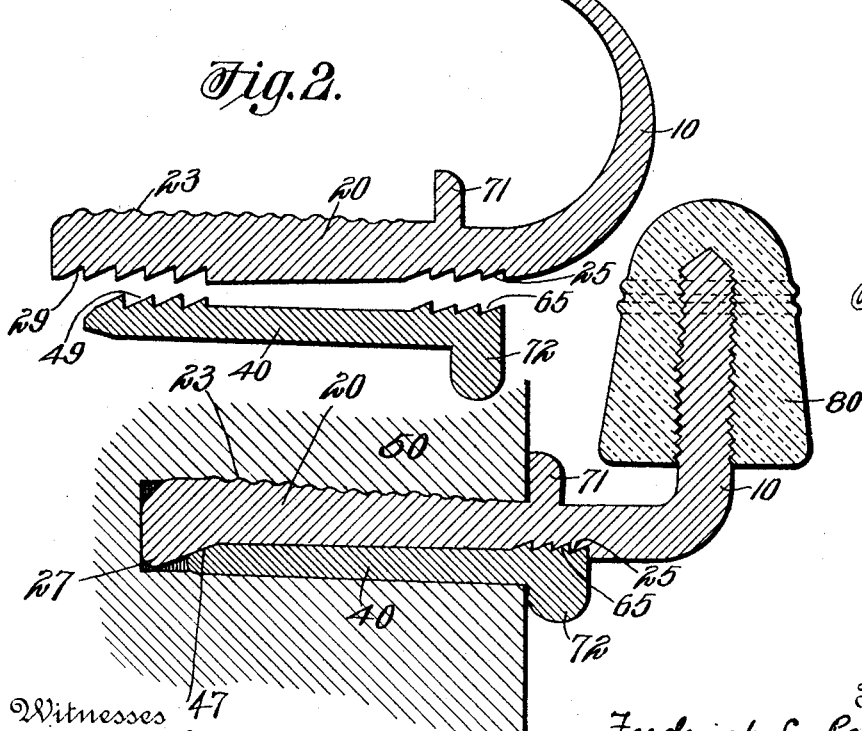
Witnesses
Alan McDonnell
S. S. Newton
Inventor
Frederick C. Palmer
By William R. Baird
Attorney No. 780,960.   Patented January 24, 1905.

UNITED STATES PATENT OFFICE.

FREDERICK C. PALMER, OF BROOKLYN, NEW YORK.

WALL-HOOK.

SPECIFICATION forming part of Letters Patent No. 780,960, dated January 24, 1905.

Original application filed January 26, 1904, Serial No. 190,750. Divided and this application filed August 25, 1904. Serial No. 222,071.

*To all whom it may concern:*

Be it known that I, FREDERICK C. PALMER, a citizen of the United States, and a resident of Brooklyn, in the county of Kings and State of New York, have invented certain new and useful Improvements in Wall-Hooks, of which the following is a specification.

This application is a division of an application filed by me January 26, 1904, Serial No. 190,750, and allowed July 26, 1904.

My invention relates to wall-hooks; and its novelty consists in the construction and adaptation of the parts comprising the means for securing the hook in place.

The object of my invention is to provide a wall-hook which is adapted for divers purposes and at the same time may be held securely in place without danger of displacement under usual conditions.

In the drawings, Figure 1 is a vertical section of a wall and an inserted wall-hook provided with my novel fastening means. Fig. 2 is a similar view of the parts before assembling and insertion in the wall. Fig. 3 is a vertical section of the same parts with the inner ends of the shank and plug not indented and an insulator mounted on the hook.

In the drawings, 10 is the wall-hook, made of any size, form, or material suitable for the purpose for which it is to be employed and provided with a shank 20, also varying to suit the circumstances of its use.

40 is a plug adapted to partially fill the aperture in the wall 50 into which the hook-shank is inserted and provided with means, presently to be described, for holding the hook in place.

In the present form the hook 10 is provided with a shank 20 of a peculiar form, and the plug 40 likewise has novel features. The shank is provided with a substantially flat under surface, interrupted, however, at 29 and 25 by indentations or corrugations. It is provided externally with bosses or projections 23 and with an upwardly-projecting flange 71, having a substantially smooth inner surface to fit snugly against the wall 50. It also tapers slightly toward the rear end, so that it is wider in vertical section at that end than at the outer end.

The plug 40 has a substantially flat upper surface, interrupted at 49 and 65, however, by indentations adapted to register and engage with the indentations 29 and 25 on the under surface of the shank 20. It is rounded or curved to fit the aperture in a wall 50 in which it is placed and when seen in central vertical section is of substantially uniform depth.

In Fig. 3 there is shown substantially the same construction as the one illustrated in Figs. 1 and 2, except that the indentations 29 on the shank and 49 on the plug are omitted, a thick depending portion 27 of the shank taking the place of the indentations 29. The shank 20 and plug 40 are placed in the aperture in the walls 50 together, and the plug then being driven in presses the shank tightly against the walls of the aperture and holds it in place, the engaging of the indentations 29 and 49 and 25 and 65 preventing accidental withdrawal and the shields 71 and 72 preventing displacement by vertical rocking due to extra weight or strain on the hook.

In Fig. 3 the hook 10 is shown with an insulator 80 on its outer end, thus illustrating one of the many uses of the device.

The thick depending inner end portion 27 of the shank, Fig. 3, has its lower surface beveled or inclined, and the inner end of the plug is provided with a correspondingly-beveled end, as at 47, so that when this construction is used the wedge-like action of the plug in driving it, due to the tapering form of the shank, is increased at the end of the driving of the plug and the inner end of the shank is pressed particularly tight against the walls of the aperture, the engagement of the indentations 25 and 65 at this time securely holding the plug against withdrawal and solidly fixing the whole device in the aperture.

What I claim is—

1. Securing means for wall-hooks or like devices comprising a shank having a plurality of transverse indentations in its surface, and a plug adapted to partially fill an aperture in which the shank is placed having corresponding indentations to engage those of the shank, the shank and plug being each provided with transverse shields to engage the surface of the wall in which said aperture is located.

2. A wall-hook or the like, comprising a shank having projections on its outer surface to engage the walls of an aperture and provided with indentations in its inner surface, and a plug having similar projections on its outer surface and provided with similar indentations in its inner surface to engage those of the shank, the shank and plug each being provided with transverse shields to engage the surface, of the wall in which said aperture is located.

3. A wall-hook or the like, comprising a shank therefor increasing in thickness toward its inner end and provided with a plurality of indentations, and a plug of uniform cross-section having similar indentations to engage those of the shank, both plug and shank being provided with transverse shields to engage the surface of the wall in which the wall-hook is secured.

Witness my hand, this 23d day of August, 1904, at the city of New York, in the county and State of New York.

FREDERICK C. PALMER.

Witnesses:
ALAN McDONNELL,
S. S. NEWTON.